(12) United States Patent
Sidorski

(10) Patent No.: US 7,095,777 B2
(45) Date of Patent: Aug. 22, 2006

(54) ARC FURNACE ELECTRODE LENGTH DETERMINATION

(75) Inventor: Eugenius Daniel Sidorski, Randburg (ZA)

(73) Assignee: Pyromet Proprietary Products (Pty) Limited, Johannesburg (ZA)

(*) Notice: Subject to any disclaimer, the term of this patent is extended or adjusted under 35 U.S.C. 154(b) by 0 days.

(21) Appl. No.: 10/527,996

(22) PCT Filed: Sep. 19, 2003

(86) PCT No.: PCT/ZA03/00136

§ 371 (c)(1),
(2), (4) Date: Mar. 21, 2005

(87) PCT Pub. No.: WO2004/028213

PCT Pub. Date: Apr. 1, 2004

(65) Prior Publication Data

US 2006/0050757 A1    Mar. 9, 2006

(30) Foreign Application Priority Data

Sep. 20, 2002  (ZA) .................................... 02/7726

(51) Int. Cl.
*H05B 7/10* (2006.01)

(52) U.S. Cl. .................... 373/100; 373/101; 373/92
(58) Field of Classification Search ............. 373/38, 373/94, 92, 98–100
See application file for complete search history.

(56) References Cited

U.S. PATENT DOCUMENTS

| 2,982,804 | A |   | 5/1961  | Redschke            |
|-----------|---|---|---------|---------------------|
| 3,107,267 | A | * | 10/1963 | Blackmore ... 373/100 |
| 3,379,818 | A |   | 4/1968  | Wynne               |
| 3,614,284 | A |   | 10/1971 | Helmut et al.       |
| 3,796,818 | A | * | 3/1974  | Yuasa et al. ... 373/92 |
| 3,898,364 | A | * | 8/1975  | Hardin ......... 373/100 |
| 5,260,966 | A |   | 11/1993 | Schottlaender       |
| 6,243,408 | B1 |  | 6/2001  | Benz et al.         |

* cited by examiner

*Primary Examiner*—Quang Van
(74) *Attorney, Agent, or Firm*—Young & Thompson

(57) ABSTRACT

An electrode column and a method of determining the length of the electrode in it in an active furnace. The column is a Söderberg column including a mantel in which the electrode is movable in an axial direction by lower and upper slipping clamps which are movable relatively to each other by slipping cylinders. The method includes the steps of moving, with the slip clamps, the electrode in a downslip relatively to the mantel with the slipping cylinders and gravity and measuring the force required to move the electrode with only the upper slipping clamp against predetermined reaction forces acting against movement of the electrode and computing these parameters to determine the mass and so the length of the electrode relatively to the theoretical mass of the undamaged electrode at the time of movement.

7 Claims, 1 Drawing Sheet

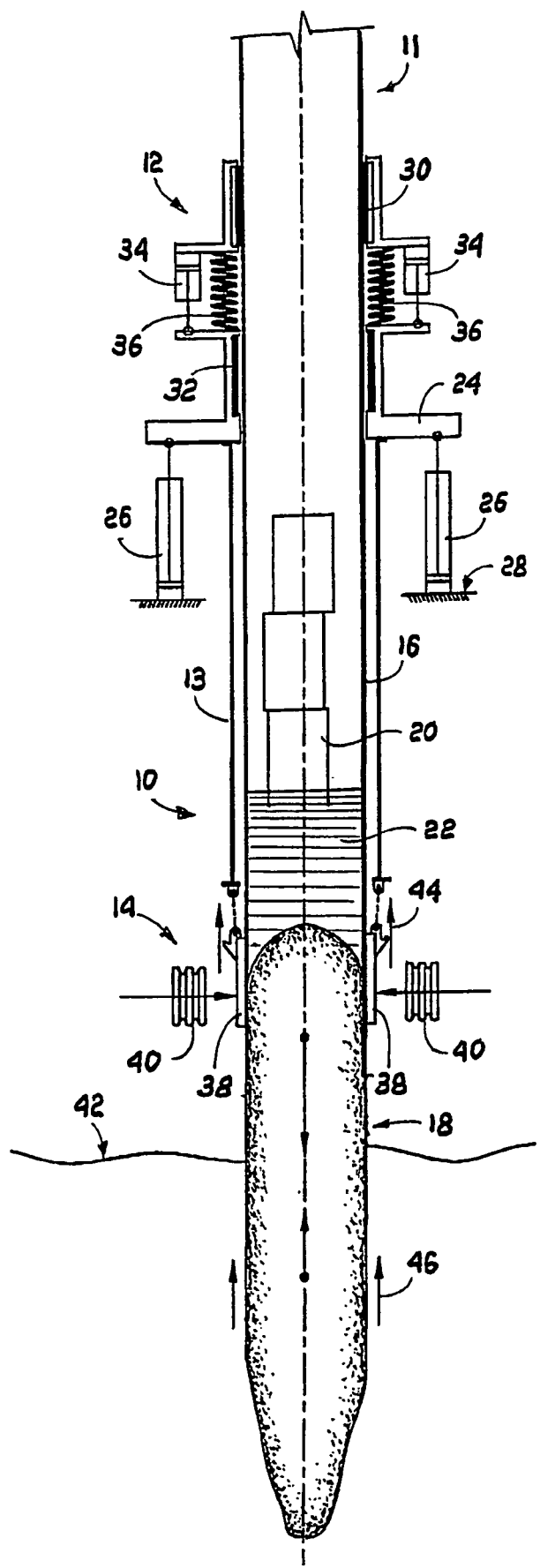

ARC FURNACE ELECTRODE LENGTH DETERMINATION

BACKGROUND TO THE INVENTION

This invention relates to a method of determining the length and possible breakage of an electrode in an arc furnace while the furnace is active and to an electrode column for carrying out the method.

BACKGROUND TO THE INVENTION

Most conventional submerged arc furnaces include a plurality of electrode columns, generally three, which each include an electrode and an electrode column mantel in which the electrode is concentrically located and is vertically slidable. The mantels are themselves slidable through suitable seal arrangements in the roof of the furnace.

The electrode mantels each include hanger arrangements from which a pressure ring and the electrical contact shoe assemblies for the electrode are suspended to be located around the electrode a little above the material in the furnace. The electrode column mantels are complicated arrangements which are connected to electrical and cooling water services by flexible cooling water supply hoses and electrical bus-tube connections.

The majority of electrodes used in furnaces of the above type are those known as Söderberg electrodes which consist of an electrode casing which extends from the top of the electrode to below the electrode contact shoes in the furnace and an electrode portion which initially consists of a carbon based paste in the electrode casing which is baked by furnace heat into an electrically conductive solid cylindrical form in the lower portion of the electrode casing. The lower end of the casing is burned from the solid portion of the electrode, from below the contact shoes, by furnace heat. A large portion of the exposed length of the solid portion of the electrode is located in the furnace material in use. The electrode column is supported in the furnace by electrical load regulating rams which act between an electrode clamp slipping arrangement and a suspended floor in the furnace building above the furnace roof.

The electrode clamp slipping arrangement generally consists of upper and lower slipping clamps which are sequentially operated and moved to extend the electrode as the tip of the electrode is consumed in use in the furnace material.

A major problem with furnaces of the above type is that of electrode breakage. An electrode break at or towards its end in the furnace material due, to perhaps uneven baking of the paste due to inconsistent furnace conditions, such as furnace material movement and so on which could induce stresses in the baked region of the electrode which ultimately lead to the electrode break. The breaks are unpredictable and difficult to detect once broken. It not infrequently happens that the electrode break is not detected by the furnace operator until a fire or in the worst case, an explosion, occurs in the furnace seriously compromising the safety of personnel in the vicinity of the furnace and the integrity of the furnace itself.

In order to minimise serious furnace downtime and the problems mentioned above due to electrode breakage, systems have been developed for detecting the breakage of an electrode in the furnace in use. In all of the known electrode break detection arrangements load cells or the like which are acted on by the electrode electrical load regulating cylinders are employed continuously to monitor the mass of the entire electrode columns and so indirectly the mass of the electrodes, in use. This electrode mass measuring arrangement is, however, highly complicated by forces acting on the total electrode column. These forces include, amongst others, the electrode contact shoe pressure on the electrode, the load variations on the mantel by roof seal friction, the mass of water and even direct load forces applied to the exposed tip portions of the electrodes by furnace rabbling and sludge with all of these parameters, some of which are unpredictable, having to be taken into calculation account in arriving at the electrode mass.

SUMMARY OF THE INVENTION

An electrode column for use in an arc furnace according to the invention comprises an electrode mantel, an electrode slipping arrangement including a lower electrode slip clamp which surrounds the electrode and which is carried by a ring beam, an upper electrode slip clamp around the electrode which is spaced vertically from and movable relatively to the lower clamp, slipping cylinders which are connected to and between both slipping clamps and electrical load regulating cylinders which are connected to act between the ring beam and fixed structure above the furnace roof, characterised in that the electrode column may include at least one resiliently yieldable load resisting device which is located between the upper slip clamp and structure on the ring beam and on which the electrode, when clamped only by the upper slip clamp may totally be supported and means for measuring the load induced yield of the load resisting device.

Conveniently, the or each load resisting device is engaged with and located between the lower and upper electrode slip clamps. The or each load resisting device may be a compression spring.

The invention extends to a method of determining the length of an electrode in the above electrode column in an active arc furnace, characterised in that the method according to the invention includes the steps of releasing the lower electrode slip clamp from the electrode, moving the electrode, in a down slip, relatively to the electrode column mantel by moving the upper slip clamp, which is clamped to the electrode, downwardly by means of the slipping cylinders and or the gravity bias of the electrode, through the released lower slipping clamp, measuring the force required to move the electrode by means only of the engaged upper slipping clamp against predetermined and comparable reaction forces acting against movement of the electrode and computing these parameters to determine the mass and so the length of the electrode relatively to the theoretical mass of the undamaged electrode at the time of movement.

The method may include the steps of fully supporting the electrode on the load resisting device to provide a reference electrode mass parameter prior to moving the electrode by means of the upper slip clamp against an increasing bias of the load resisting device with the electrode mass support and movement forces being provided as electrode length reference parameters to the computer.

The method may include the steps of first performing the down slip of the electrode through the released lower slip clamp over a set slipping length and then, by means of the slipping cylinders, performing an upward slip of the electrode through the released upper slip clamp with a stroke length equivalent to that of the down slip and computing the electrode mass and slipping cylinder pressure parameters during each of the slips to calculate the effective length of the electrode.

The method may additionally include the step during the downslip extension of the electrode from the mantel into the furnace material of performing two down slips and one up slip and computing the electrode mass and slipping cylinder pressure parameters during one of the down slips and the up slip to calculate the effective length of the electrode.

BRIEF DESCRIPTION OF THE DRAWINGS

The invention is now described by way of example only with reference to the drawing which is a diagrammatic side elevation of a furnace electrode and apparatus used in conjunction with it in the carrying out of the method of the invention.

DETAILED DESCRIPTION OF THE ILLUSTRATED EMBODIMENT

The drawing shows an electrode column 10 which includes a Söderberg electrode 11, and electrode slip arrangement indicated generally at 12, an electrode mantel 13, and a segmented pressure ring assembly 14.

The electrode 11 includes a cylindrical metal casing 16 and an exposed electrode tip portion 18. The electrode 11 is operated in the conventional manner of a Söderberg electrode by loading paste cylinders 20, paste blocks or chunks into the electrode casing 16 from its upper end, melting the paste in the casing in a furnace heat zone 22 and periodically extending the electrode tip portion 18, which has been baked into solid form below the melt zone and from which the casing 16 has been burned, into the furnace material. This process is continued while the furnace is in operation by adding solid paste to the casing 16 as the tip portion of the electrode is consumed in use.

The electrode slip arrangement 12 is attached to a ring beam 24 which is movably supported on electrical load regulating cylinders 26 which are fixed to a suspended floor 28 in the furnace enclosure above the furnace roof, not shown. The slip arrangement 12 additionally includes upper and lower slip clamps 30 and 32 respectively which are movable on and relatively to the electrode casing 16 and, between the slip clamps, a plurality of slipping cylinders 34 and reference compression springs 36.

The pressure ring assembly 14, as shown in the drawing, is suspended from the mantel 13 and surrounds the electrode 11 below the melt zone 22 in the casing 16. The pressure ring assembly 14 is conveniently that disclosed in our South African patent No. 99/3870 and acts on the electrode electrical contact shoes 38 which are forced into pressure contact with the electrode casing by pressure ring segment bellows 40.

The electrode operation within a submerged arc furnace will now be described referring only to a single electrode as illustrated in the drawing but it is to be understood that the same description applies to the remaining electrodes in the furnace.

In normal furnace use, the electrode 11 is suspended in its mantel 13, and is vertically movable independently of the mantel. The electrode mantel 13 which carries the cooling water and electrical bus-tube connections (not shown), the pressure ring assembly 14 and the electrode contact shoes 38, is attached to and suspended from the ring beam 24.

With the lower end 18 of the electrode 11 immersed in the furnace mix 42, as shown in the drawing, the electrical load on the electrode is regulated by up and down movement of the electrical load regulating cylinders 26 which move the electrode together with its mantel upwardly and downwardly in controlling the load. As the tip of the electrode in the furnace mix 42 is consumed it is required to extend the electrode 11 through the contact shoes 38 further into the furnace material. The solid portion 18 of the electrode is constantly produced during the operation of the furnace through the baking process described above.

As mentioned above it periodically becomes necessary to extend the electrode tip portion 18 into the furnace mix 42 to cater for electrode consumption. To achieve this a down slip cycle of the electrode 11 is carried out as follows:

(a) The lower slip clamps 32 are released from the electrode and the electrode is then suspended only from the upper slip clamps 30 with the slip clamp 30 arrangement in turn being supported on the reference springs 36. The springs 36 are set to a predetermined load supporting deflection (which is the same for all three electrodes) which is used as a reference point in the mass measurement of the electrode 11.

(b) The slipping cylinders 34 are now, if necessary, activated to press the gravity biased electrode downwardly, within the relatively stationary electrode column mantel, against the known bias of the springs 36, through the contact shoes 38 and against the clamping pressure of the electrical contact shoes 38 on the electrode with this frictional load being indicated by the contact shoe load vector 44 in the drawing. The electrode is moved downwardly through a predetermined slip increment distance.

(c) The lower slip clamps 32 are then reclamped, at the end of the downward slip increment, to the electrode and the electrode is again suspended by both the upper and lower slip clamps 30 and 32, and (d) The upper clamping shoes are then released and moved to their upper limit as shown in the drawing, and reclamped to be ready for the next slip.

To commence the downward slip of the electrode 11 the slipping cylinders 34 are energised, as mentioned above, and the hydraulic pressure in the cylinders builds up against a load consisting of various unknown static frictional resistances acting on the gravity biased electrode and the slipping spring 36 reaction bias to a point where motion of the electrode is achieved and the unknown static friction creating forces are overcome to transfer the motion to a stage of kinetic friction. In the kinetic stage the hydraulic slipping cylinders 34 have the linearly increasing spring 36 load, kinetic frictional resistances, the buoyancy effects of the furnace mix 42 acting on the electrode, as indicated by the vector arrows 46, and the contact shoe 38 resistance to overcome. These factors are measurable entities. Knowing these factors, the length of the electrode 11 can be determined using the slipping cylinder 34 hydraulic pressures through a data collection process and any unpredictable loss of mass of the electrode, such as would be caused by an electrode break in the furnace mix is detected.

In the preferred method of electrode length determination of the invention the data collection process involves two downward slips and one upward slip, during which the clamping and unclamping sequence of the two slipping clamps 30 and 32 are reversed from the sequence described above, as follows:

As a down slip is initiated the hydraulic pressure in the slipping cylinders 34 is monitored and again monitored during the second slip. Finally the cylinder hydraulic pressure is again monitored during the up slip. These pressure values are then evaluated to determine the mass of the electrode 11 and if a break exists, to detect it.

The above up slip against gravity contributes to high accuracy of the various parameter measurements as the electrode is no longer influenced by the buoyancy effects which generally vary throughout the furnace bath and therefore affect each electrode differently. Movement upwardly, against gravity, provides more uniform and predictable conditions for all of the electrodes. If an electrode is broken, an up slip will detect this immediately as the broken section will remain in the furnace mix with a noticeable difference in data readings relatively to the remaining electrodes and its own previous readings. using the above method of electrode mass determination far smaller electrode breakages can be detected than is possible with known electrode length detecting systems.

In addition, at any time (other than when a slip is required) the electrode 11 may be checked for breaks or electrode length by activating a "check" slip sequence. The "check" sequence is carried out as follows:

A forward slip is initiated and the hydraulic pressure of the cylinders 34 is monitored. A back-slip is initiated and the hydraulic pressure is monitored. the results of the two slips is evaluated to determine if the electrode is fully intake and the electrode returned to its initial position prior to the "check".

A further major advantage to the length detection method of the invention over that of the prior art is that in using the method of the invention only the mass of the electrode is measured against external forces acting on it whereas in the prior art electrode length measuring systems the entire electrode column (electrode, mantel and electrode equipment) which has a mass which could be as much as three times the mass of the electrode only, serves as the mass input in the length determination calculations. in addition, as the electrode column mass is monitored, additional loading effects, which are undeterminable, from the current carrying buss-tube flexibles and cooling water flexibles distort the readings. These flexibles are necessary to cater for electrode movement.

The invention is not limited to the precise details as herein described. For example the springs 36 could act between the clamp 30 slip arrangement and fixed structure attached to the beam 24 as opposed to the slip clamp 32 arrangement as described above. Additionally, should it at any time during furnace operation be desired to do so the electrode contact shoes 38 could be released from the electrode 11 to remove their clamping friction parameter from an electrode mass determination during an electrode slip.

The invention claimed is:

1. An electrode column [10] for use in an arc furnace comprising an electrode mantel [13], an electrode [11] which is concentrically located in and movable in an axial direction relatively to the mantel [13], an electrode slipping arrangement [12] including a lower electrode slip clamp [32] which surrounds the electrode [11] and which is carried by a ring beam, an upper electrode slip clamp [30] around the electrode [11] which is spaced vertically from and movable relatively to the lower clamp [32], slipping cylinders [34] which are connected to and between both slipping clamps [30,32] and electrical load regulating cylinders [26] which are connected to act between the ring beam [24] and fixed structure above the furnace roof, characterised in that the electrode column [10] includes at least one resiliently yieldable load resisting device [36] which is located between the upper slip clamp [30] and structure on the ring beam [24] and on which the electrode [11], when clamped only by the upper slip clamp [30] may totally be supported and means for measuring the load induced yield of the load resisting device [36].

2. An electrode column [10] as claimed in claim 1 wherein the or each load resisting device [36] is engaged with and located between the lower [32] and upper [30] electrode slip clamps.

3. An electrode column as claimed in claim 1 wherein the or each load resisting device is a compression spring [36].

4. A method of determining the length of an electrode [11] in an electrode column [10] as claimed in claim 1 in an active arc furnace characterised in that the method includes the steps of releasing the lower electrode slip clamp [32] from the electrode [11], moving the electrode [11], in a down slip, relatively to the electrode column [10] mantel [13] by moving the upper slip clamp [30], which is clamped to the electrode [11], downwardly by means of the slipping cylinders [34] and or the gravity bias of the electrode [11], through the released lower slip clamp, measuring the force required to move the electrode [11] by means only of the engaged upper slipping clamp [30] against predetermined and comparable reaction forces acting against movement of the electrode [11] and computing these parameters to determine the mass and so the length of the electrode [11] relatively to the theoretical mass of the undamaged electrode at the time of movement.

5. A method as claimed in claim 4 including the steps of fully supporting the electrode [11] on the load resisting device [36] to provide a reference electrode [11] mass parameter prior to moving the electrode [11] by means of the upper slip clamp [30] against an increasing bias of the load resisting device [36] with the electrode [11] mass support and movement forces being provided as electrode length reference parameters to a computer.

6. A method as claimed in claim 4 including the steps of first performing the down slip of the electrode through the released lower slip clamp [32] over a set slipping length and then, by means of the slipping cylinders [34], performing an upward slip of the electrode [11] through the released upper slip clamp [30] with a stroke length equivalent to that of the down slip and computing the electrode mass and slipping cylinder pressure parameters during each of the slips to calculate the effective length of the electrode.

7. A method as claimed in claim 4 including the step, during the downslip extension of the electrode [11] from the mantel [13] into the furnace material [42], of performing two down slips and one up slip and computing the electrode [11] mass and slipping cylinder [34] pressure parameters during one of the down slips and the up slip to calculate the effective length of the electrode.

* * * * *